March 2, 1926.
O. G. PHILLIPS
OIL COMPRESSION BRAKE
Filed Oct. 15, 1924
1,575,592
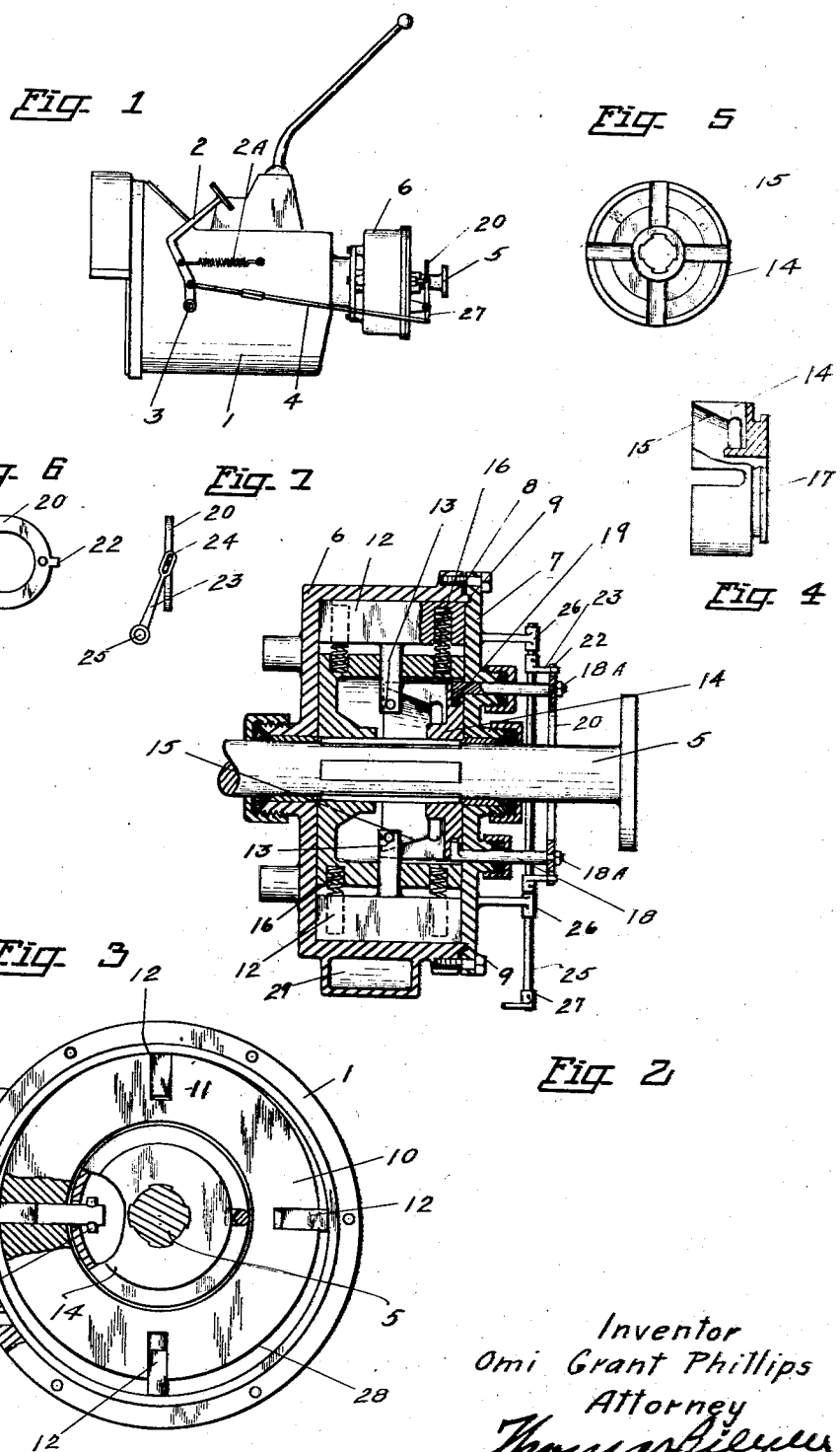
Inventor
Omi Grant Phillips
Attorney Patented Mar. 2, 1926.

1,575,592

UNITED STATES PATENT OFFICE.

OMI GRANT PHILLIPS, OF PORTLAND, OREGON, ASSIGNOR OF ONE-HALF TO KATHRYN B. SWIFT, OF PORTLAND, OREGON.

OIL-COMPRESSION BRAKE.

Application filed October 15, 1924. Serial No. 743,720.

*To all whom it may concern:*

Be it known that I, OMI GRANT PHILLIPS, a citizen of the United States, residing at Portland, in the county of Multnomah and the State of Oregon (whose post-office address is 6408 62d Avenue SE., in said city and State), have invented a new and useful Improvement in an Oil-Compression Brake, of which the following is a specification.

My invention is intended for use upon automobiles, having a prime mover transmitting power through a drive shaft and is adapted to placement upon the transmission housing of the same, and to be actuated from the operating brake pedal. The brake consists primarily of a housing adapted to being bolted or otherwise secured to the transmission case and located about the transmission shaft. A vaned rotor within the housing, and means for regulating the location of the vanes from the exterior of the housing. An operating liquid of oil, or the like, maintained within the housing. The braking to be accomplished by restricting the flow of the oil medium from one compartment to the other. I have provided a compression brake of few parts, that will be self lubricating, and one wherein the compression members are housed in from the dust and grit. I have further provided a reservoir that makes refilling and the furnishing of an operating supply a comparatively easy matter.

I attain these objects by the mechanism illustrated in the accompanying drawings, in which—

Fig. 1 is a side elevation of a transmission case and one of my oil compression brakes assembled as one unit.

Fig. 2 is a section view of the compression brake shown detached from the transmission case.

Fig. 3 is an end view of the mechanism shown in Fig. 2 with the case partially broken away to show the inner construction of the same.

Fig. 4 is a partial side, partial section view of the actuator shown removed from the housing.

Fig. 5 is an end view of the mechanism shown in Fig. 4.

Fig. 6 is an end view of the connecting ring to which is attached the operating lever.

Fig. 7 is a side view of the mechanism shown in Fig. 6.

Like reference characters refer to like parts throughout the several views.

For convenience of a specification I have here shown one of my oil compression brakes attached to a transmission case 1 having the usual brake or foot pedal attached thereto about the pivot 3 and a connecting and operating rod 4 connecting the foot pedal with the brake mechanism. The foot pedal is shown at 2 and which is held in normal position by the action of spring 2ª. The driving shaft 5 is used to transmit power from the prime mover to the source of application and has mounted thereupon a housing 6 and to prevent leakage of the operating fluid or oil medium a suitable stuffing box is provided. An end closure is attached to the housing as shown at 7 and is attached thereto by suitable connections as shown at 8. To form a tight compression connection to withstand leakage from internal pressure a suitable stuffing box is provided around the shaft and a suitable packing 9 is placed between the housing and the end closure. The rotor 10 is secured to the shaft by suitable means and is made to rotate with the shaft and has a series of slots about its outer periphery and adapted to maintain a series of vanes therein, and of sufficient stability and strength to withstand a heavy pressure against one side of the same. The vanes to be normally held in a depressed position by artificial pressure as that of an actuator 14. The vanes 12 operating in slidable relation with the rotor are actuated within the slots 11. The vanes have pins 13 passing through the lower end of the same and are adapted to contact with the sloping bearing 15 within the actuator which positions the vanes at the desired location to create the resistance necessary to act as a braking force. The springs 16 as well as the action of centrifugal force tend to force the vanes in an outward, or extended position and to cause the pins 13 to contact with the inclined surfaces 15 of the actuator. The actuator 14 is attached to the shaft 5 in slidable relation therewith, but rotates as the shaft is rotated, the actuator having an annular groove 17 in its outer periphery into which projections 19 of the arms 18 engage. To prevent leakage of the operating fluid where these arms pass through the end closure suitable stuffing boxes are provided. The arms 18 pass through the openings 21 in the ring 20 and are held in fixed relation therewith by suitable means, as a nut 18ª. The ring 20 has an engaging lug 22 on opposite edges of the same for engagement with the operating arm 23 having a compensating slot 24 therein. The arm 23 is secured to the shaft 25 which is held in position by lugs 26. The shaft 25 is partially rotated by the action of arm, 27 which is connected to the foot pedal by the rod 4. The eccentric chamber 28 is filled with a suitable fluid such as castor oil, glycerine and the like, and as the vanes are permitted to move outward from the rotating center, the operating fluid will be placed under compression. Since the construction of my device is made close and leakage is prevented by all passages into, or through, the housing, or end closure, are made tight by suitable stuffing boxes, this compression will be limited by the amount of clearance that will exist between the outer ends of the vanes and the inner wall of the housing. The operating fluid being of an oily nature friction will be reduced to a minimum and all operating parts within the housing being surrounded with the same material, wear will be reduced in like manner. When the vanes are made to contact with the housing on their outer ends the brake will be locked, and no rotation will occur. The greater the eccentric chamber the greater will be the flexibility of the brake.

To afford a means of replenishing the operating fluid with a minimum amount of trouble I have provided a well 29 with a filling plug 30. This well is made a part of the housing and located where filling is an easy matter.

Having thus described my invention, I wish to make the following claims, therefor—

1. An oil compression brake comprising a driven shaft, a housing about said shaft, a closure for said housing, a rotor within said housing adapted to rotate with the driven shaft, lots within the rotor adapted to maintain vanes in slidable relation with said slots, an actuator adapted to rotate with the driven shaft and in slidable relation therewith and adjustable through the end closure, sloping surfaces within the actuator adapted to position the vanes, an annular groove connected to a filling well and an operating fluid within the well.

2. An oil compression brake comprising a driven shaft, a housing and end closure about said shaft and adapted to maintain a fluid therein under pressure, a vaned rotor secured to the shaft within the enclosed housing, an actuator rotatable with the shaft and adapted to slidable positioning along the shaft, having sloping surfaces and slots adapted to position the vanes in respect to their center of rotation, springs for positioning the vanes in relation with the sloping surfaces of the actuator, actuating arms adapted to manipulation from the foot pedal, and an eccentric chamber within the housing connecting with a fluid well.

3. An oil compression brake comprising a driven shaft, a housing and an end closure adapted to maintain an operating fluid, under pressure, about said driven shaft, means for attaching said housing to the transmission case of an automobile, a slotted rotor secured to said shaft within the housing and having vanes fitted to said slots and adapted to being depressed by spring action, pins connected to said vanes and adapted to contact with sloping surfaces of an actuator adapted to position the vanes by manipulation from the exterior of the housing, a fluid holding well adapted to being filled, forming a part of the housing and connecting to an eccentric chamber and an oily operating fluid.

4. An oil compression brake comprising a driven shaft, a housing and end closure adapted to maintaining an operating fluid therein, under pressure about said shaft, a slotted rotor secured to said driven shaft within the housing and having vanes operating within the slots, positioning means for said vanes, an eccentric chamber within the housing connected to a fluid holding well and adapted to being filled, and an operating fluid within the, otherwise, unoccupied space within the housing and end closure.

OMI GRANT PHILLIPS.